US012657866B2

(12) United States Patent
Matsuo et al.

(10) Patent No.: US 12,657,866 B2
(45) Date of Patent: Jun. 16, 2026

(54) DETECTION METHOD

(71) Applicant: KONICA MINOLTA, INC., Tokyo (JP)

(72) Inventors: Tsukasa Matsuo, Machida (JP); Hiroshi Negishi, Hino (JP); Keisuke Yamaguchi, Hino (JP); Yuki Miyake, Kawasaki (JP); Toshihiko Iwasaki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 338 days.

(21) Appl. No.: 18/483,805

(22) Filed: Oct. 10, 2023

(65) Prior Publication Data

US 2024/0161453 A1 May 16, 2024

(30) Foreign Application Priority Data

Nov. 11, 2022 (JP) ................................. 2022-181086

(51) Int. Cl.
*G06V 10/60* (2022.01)
*G06T 5/20* (2006.01)
(Continued)

(52) U.S. Cl.
CPC ................ *G06V 10/60* (2022.01); *G06T 5/20* (2013.01); *G06T 5/50* (2013.01); *G06T 7/194* (2017.01);
(Continued)

(58) Field of Classification Search
CPC ...... G06V 10/60; G06V 10/44; G06V 10/145; G06V 20/693; G06V 20/695; G06T 5/20;
(Continued)

(56) References Cited

U.S. PATENT DOCUMENTS

2002/0022274 A1* 2/2002 Krahn ................... G01N 33/542
436/172
2004/0234157 A1* 11/2004 Forman ................ G06V 10/255
382/260
(Continued)

FOREIGN PATENT DOCUMENTS

CN 114882439 A * 8/2022 ............. G06N 3/044
JP 2013057937 A 3/2013
WO 2019087853 A1 5/2019

*Primary Examiner* — Oneal R Mistry
*Assistant Examiner* — Justin Philip Cascais
(74) *Attorney, Agent, or Firm* — Buchanan Ingersoll & Rooney PC

(57) ABSTRACT

A detection method includes: preparing sample image data of a sample in which a target substance is labeled with a labeling substance; acquiring first background image data in which an image feature amount of a single bright spot in the sample image data is reduced by a first filter; acquiring second background image data in which an image feature amount of a dense bright spot in the sample image data is reduced by a second filter; synthesizing the first background image data and the second background image data on a basis of brightness information of the sample image data and acquiring synthesized background image data; and obtaining difference image data that is a difference between the sample image data and the synthesized background image data.

8 Claims, 6 Drawing Sheets

(51) Int. Cl.
   *G06T 5/50*       (2006.01)
   *G06T 7/194*      (2017.01)
   *G06V 10/44*      (2022.01)

(52) U.S. Cl.
   CPC .... *G06V 10/44* (2022.01); *G06T 2207/20032* (2013.01); *G06T 2207/20224* (2013.01)

(58) Field of Classification Search
   CPC . G06T 5/50; G06T 7/194; G06T 2207/20032; G06T 2207/20224; G06T 2207/10064; G06T 2207/30024; G06T 7/0014
   See application file for complete search history.

(56)                    References Cited

U.S. PATENT DOCUMENTS

| 2019/0012773 A1* | 1/2019 | Zerfass | .................... G06T 5/20 |
| 2023/0230229 A1* | 7/2023 | Wu | ........................... G06T 5/70 |
| | | | 436/172 |

\* cited by examiner

FIG. 3A
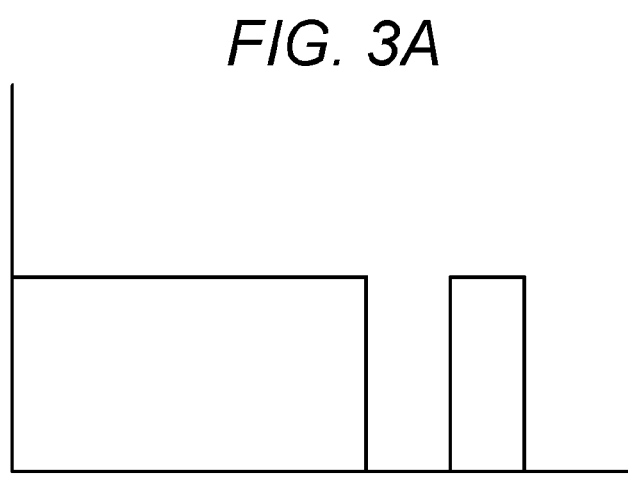
DISTANCE
FIG. 3B
DISTANCE
FIG. 3C
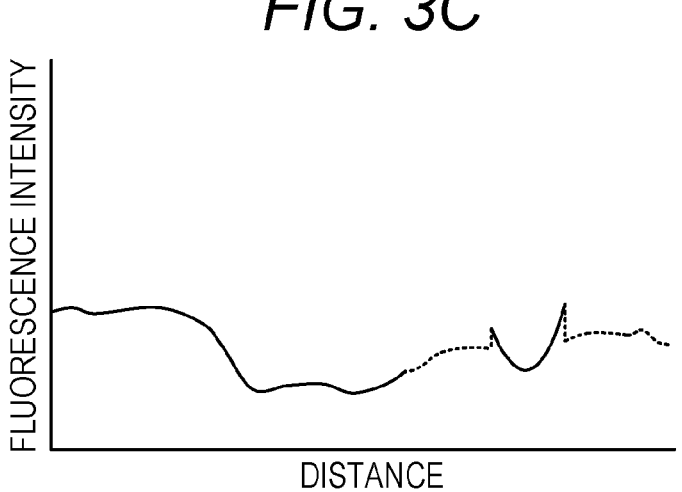
FLUORESCENCE INTENSITY
DISTANCE

DETECTION METHOD

The entire disclosure of Japanese patent Application No. 2022-181086, filed on Nov. 11, 2022, is incorporated herein by reference in its entirety.

BACKGROUND

Technological Field

The present invention relates to a detection method.

Description of the Related Art

In pathological diagnosis, quantifying an expression level of a substance to be observed by using a tissue section or the like can be significantly important information for predicting prognosis and determining a subsequent treatment plan. It is therefore significantly important to accurately quantify the substance to be observed in a tissue section or the like. As a method of quantifying a substance to be observed, a method is known in which the substance to be observed is labeled with a fluorescent substance and detected with high sensitivity (see, for example, WO 2019/087853 A).

WO 2019/087853 A discloses a method of quantifying the expression level of the substance to be observed in a tissue section after immunostaining. In the method disclosed in WO 2019/087853 A, first, a fluorescence intensity distribution of the tissue section in which the substance to be observed is fluorescently labeled is detected. Next, in order to remove autofluorescence, an area including only a frequency component higher than a predetermined spatial frequency is extracted. Finally, the number of bright spots derived from the fluorescent substance is measured to quantify the substance to be observed.

However, in the quantitative method disclosed in WO 2019/087853 A, only a bright spot that is not dense and exists alone is a quantitative target, and a group of bright spots in which bright spots are dense is not targeted. Since the labeling substance including a fluorescent substance adheres to a specific biological substance, it is also conceivable that bright spots are densely distributed in a predetermined narrow area. In this case, the quantification method disclosed in WO 2019/087853 A has a problem that a bright spot existing along and not dense can be appropriately quantified, but a group of dense bright spots cannot be appropriately quantified.

SUMMARY

An object of the present invention is to provide a detection method capable of appropriately detecting both a bright spot existing alone and a group of bright spots existing densely.

To achieve the abovementioned object, according to an aspect of the present invention, a detection method reflecting one aspect of the present invention comprises: preparing sample image data of a sample in which a target substance is labeled with a labeling substance; acquiring first background image data in which an image feature amount of a single bright spot in the sample image data is reduced by a first filter; acquiring second background image data in which an image feature amount of a dense bright spot in the sample image data is reduced by a second filter; synthesizing the first background image data and the second background image data on a basis of brightness information of the sample image data and acquiring synthesized background image data; and obtaining difference image data that is a difference between the sample image data and the synthesized background image data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 3A to 3C are diagrams for describing a step of acquiring synthesized background image data;

DETAILED DESCRIPTION OF EMBODIMENTS

Hereinafter, one or more embodiments of the present invention will be described with reference to the drawings. However, the scope of the invention is not limited to the disclosed embodiments.

Hereinafter, a detection method according to an embodiment of the present invention will be described in detail.

Figure 1:
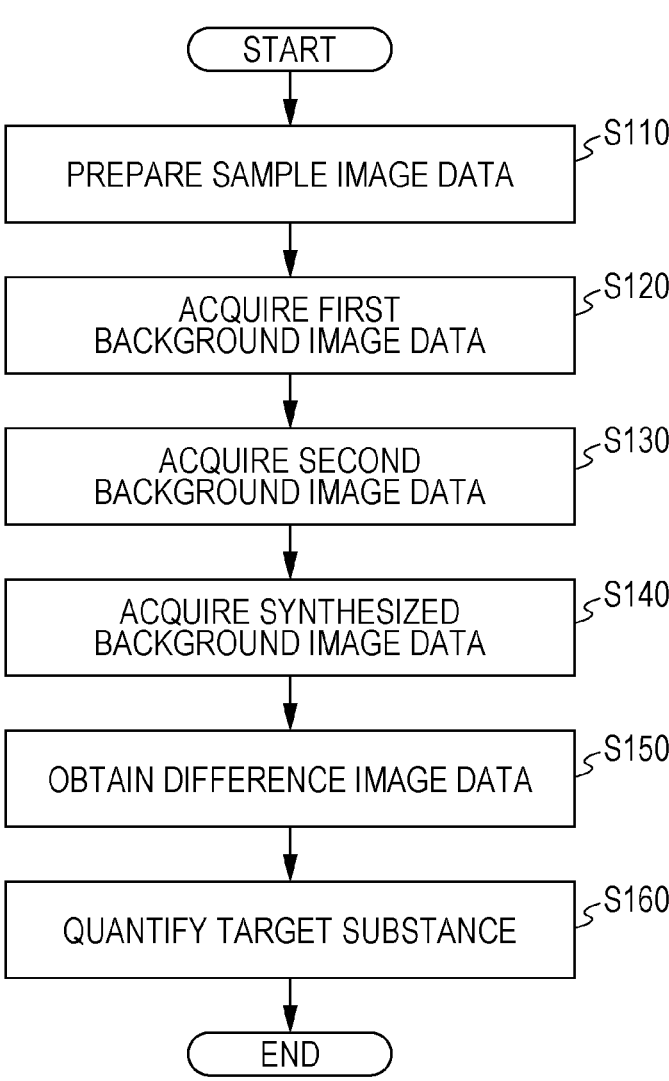
FIG. 1 is a flowchart of a detection method according to an embodiment of the present invention.

FIG. 1 is a flowchart of a detection method according to an embodiment of the present invention. FIGS. 2A, 2B, 3A to 3C, 4A, and 4B are diagrams for describing a detection method according to an embodiment of the present invention. In FIGS. 2A, 2B, 3C, 4A, and 4B, a horizontal axis represents distance, and a vertical axis represents fluorescence intensity.

As illustrated in FIGS. 1, 2A, 2B, 3A to 3C, 4A, and 4B, a detection method according to an embodiment of the present invention includes preparing sample image data of a sample in which a target substance is labeled with a labeling substance, acquiring first background image data in which an image feature amount of a single bright spot in the sample image data is reduced by a first filter, acquiring second background image data in which an image feature amount of a dense bright spot in the sample image data is reduced by a second filter, synthesizing the first background image data and the second background image data on the basis of brightness information of the sample image data and acquiring synthesized background image data, and obtaining difference image data that is a difference between the sample image data and the synthesized background image data.

Figure 2A:
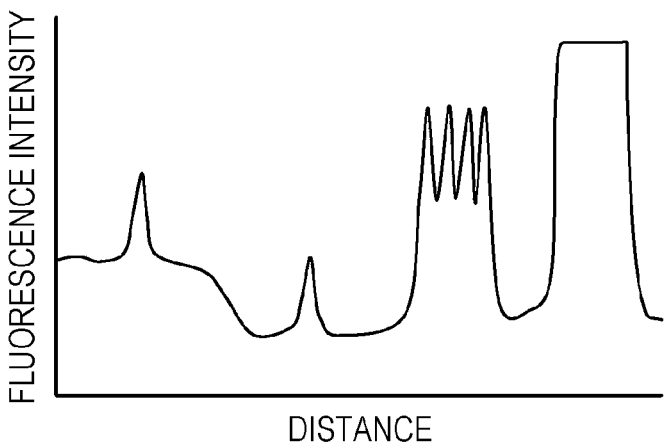
FIG. 2A is a schematic graph illustrating an intensity distribution of sample image data.

FIG. 2A shows a relationship between the distance and the fluorescence intensity in a part of the sample image data. As illustrated in FIGS. 1 and 2A, in the step of preparing the sample image data, sample image data to be used for detection is prepared (S110). The sample image data is acquired by imaging a biological sample in which a target substance is labeled with a labeling substance. The number of sample image data is not limited. The number of sample image data may be one or more. By preparing a plurality of sample image data, it is possible to observe a quantitative relationship of a biological substance, localization of a target substance (substance to be observed), and the like between the plurality of sample image data. Here, the type of the biological sample used for the sample image is not limited as long as the biological substance can be detected. Examples of the biological sample include a pathological tissue, a tissue section such as cell line-derived xenograft (CDX) or patient-derived xenograft (PDX), and a sample prepared from a cultured cell.

The biological substance is a substance to be quantified and is included in the biological sample. The type of the biological substance is not limited. Examples of the biological substance include nucleic acids (DNA, RNA, polynucleotide, oligonucleotide, peptide nucleic acid (PNA) or the like which may be single-stranded or double-stranded, or nucleosides, nucleotides and modified molecules thereof); protein (polypeptides, oligopeptides, receptors present in cell membranes of target cells, and the like), amino acid (also including modified amino acids); carbohydrates (oligosaccharides, polysaccharides, sugar chains, and the like); lipids; exosome; or a modified molecule or complex thereof. Specific examples of the biological substance include 5T4, AXL, BCMA, C4.4A, CA6, Cadherin 3, Cadherin 6, CEACAM5, CD16, CD19, CD22, CD37, CD56, CD71, CD138, CD142, CD352, DLL3, EphA2, EphrinA4, ETBR, FcγRIII, FOLR1, FGFR2, FGFR3, GCC, HER1(EGFR), HER2, HER3, HER4, IntegrinαV, LAMP1, LIV1, Mesothelin, MUC1, MUC16, NaPi2B, Nectin4, NOTCH3, PD-1, PD-L1, PSMA, PTK7, SLAMF7, SLITRK6, STEAP1, TROP2, Ki67, HER4, ER, and PR.

The biological substance is labeled with a labeling substance. Examples of a method of labeling the biological substance include an immunostaining method using an antibody or a fragment of an antibody, and a staining method using a molecular recognition group similar to an antibody. In the method of labeling a biological substance by a staining method using a molecular recognition group similar to an antibody, for example, an aptamer or a SNAP-tag is used as the molecular recognition group. Examples of the labeling substance include phosphor integrated particles and other fluorescent substances.

In the method of labeling by the immunostaining method, a biological sample including a biological substance is immunostained to acquire an immunostained image in which the biological substance is visualized by fluorescent labeling.

In a secondary reaction of the immunostaining method, a labeling substance including phosphor integrated particles and other fluorescent substances can be used. For example, the target substance is labeled with a labeling substance including fluorescent dye integrated particles.

The phosphor integrated particles are nano-sized particles having a structure in which a plurality of phosphors (for example, a fluorescent dye or a semiconductor nanoparticle) is contained therein and/or adsorbed on the surface thereof with particles including an organic substance or an inorganic substance as a base. Examples of the fluorescent dye constituting the phosphor integrated particles include a rhodamine dye, a Cy dye, an Alexa Fluor (registered trademark) dye, a BODIPY dye, a squarylium dye, a cyanine dye, an aromatic ring dye, an oxazine dye, a carbopyronin dye, and a pyrromethene dye. Examples of a material of the semiconductor nanoparticle constituting the phosphor integrated particles include a II-VI compound semiconductor, a III-V compound semiconductor, or a IV compound semiconductor. The phosphor integrated particles can be produced by a known method (see, for example, JP 2013-057937 A).

Figure 2B:
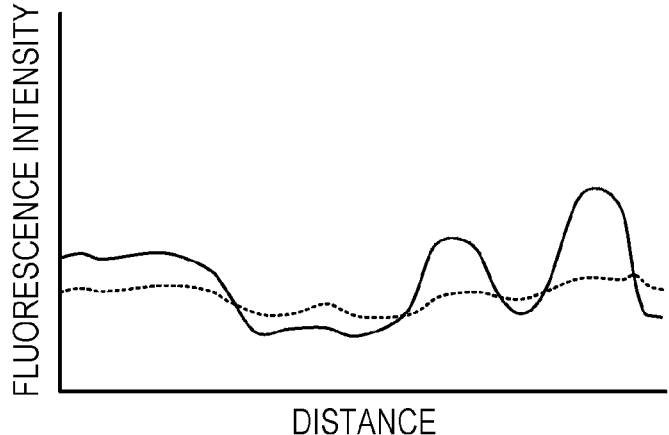
FIG. 2B is a schematic graph illustrating an intensity distribution of first background image data and second background image data.

FIG. 2B shows a relationship between the distance and the fluorescence intensity in a part of the first background image data. The dotted line in FIG. 2B indicates the first background image data, and the solid line indicates the second background image data. As illustrated in FIGS. 1 and 2B, in the step of acquiring the first background image data, the first background image data in which the image feature amount of the single bright spot in the sample image data is reduced by the first filter is acquired (S120). Specifically, a first background image of a bright spot existing alone is acquired in the sample image data by the first filter. Here, the term "alone" means that a total signal value of skirt portions of the bright spots is equal to or less than a signal value other than a signal value derived from the labeling substance due to a proximity of the bright spots. For example, although a skirt signal pattern of the bright spot depends on an imaging system, in a case where a magnification is 20 times, NA is 0.8, and a pixel pitch on a captured image is 0.325 μm, when the distance is more than 2 μm, it can be considered that the bright spot exists alone. The type of the first filter is not limited as long as the image feature amount of the single bright spot can be reduced. Examples of the first filter include a median filter and a frequency filter. In the present embodiment, the first filter is a median filter. In addition, in the present embodiment, the image feature amount is an intensity distribution of light emitted from a labeling substance existing alone.

As illustrated in FIGS. 1 and 2B, in the step of acquiring the second background image data, the second background image data in which the image feature amount of the dense bright spot in the sample image data is reduced by the second filter is acquired (S130). Specifically, a second background image of a group of bright spots existing densely is acquired in the sample image by the second filter. Here, "dense" means that the particles exist at a distance between bright spots at which the total signal value of the skirt portions of the bright spots starts to become significantly higher than the signal value other than the signal value derived from the labeling substance due to the proximity of the bright spots. For example, although the skirt signal pattern of the bright spot depends on the imaging system, in a case where the magnification is 20 times, the NA is 0.8, and the pixel pitch on the captured image is 0.325 μm, when an inter-particle distance is distributed at a distance of less than 2 μm, it can be considered that the bright spots exist densely. The type of the second filter is not limited as long as the image feature amount of the dense bright spot can be reduced. Examples of the second filter include a median filter and a frequency filter. In the present embodiment, the first filter is a median filter. In addition, in the present embodiment, the image feature amount is an intensity distribution of light emitted from a labeling substance existing densely.

A first intensity distribution (image feature amount) of light in the sample image data reduced by the first filter and a second intensity distribution (image feature amount) of light in the sample image data reduced by the second filter are different in a peak width in the intensity distribution of light, a peak height in the intensity distribution, or the peak width and the peak height. For example, the first intensity distribution (image feature amount) of light in the sample image data reduced by the first filter has a smaller peak width and a lower peak height than those of the second intensity distribution (image feature amount) of light in the sample image data reduced by the second filter. Conversely, the second intensity distribution (image feature amount) of light in the sample image reduced by the second filter has a wider peak width and a higher peak height than those of the first intensity distribution (image feature amount) of light in the sample image reduced by the first filter. This is considered to be because the intensity of light overlaps depending on the density of bright spots.

In the present embodiment, the first filter which is a median filter and the second filter which is a median filter are different in the number of pixels processed at a time. For example, when the labeling substance includes phosphor integrated particles and the size of the phosphor integrated particles on a screen is 9 pixels×9 pixels, the number of pixels processed at a time by the first filter is about 9 pixels×9 pixels, and the number of pixels processed at a time by the second filter is about 80 pixels×80 pixels to 90×90 pixels. As described above, in the present embodiment, a narrow area is processed by the first filter, and a wide area is processed by the second filter, so that it is possible to detect a bright spot existing alone and a group of bright spots existing densely. When frequency filters are used as the first filter and the second filter, for example, processing is performed such that a filter that allows passage of only an area having a high spatial frequency in spatial frequency information of an original image is set as first filter, and a filter that allows passage of only an area having a low spatial frequency in the spatial frequency information of the original image is set as second filter.

FIGS. 3A and 3B are the first background image data and the second background image data binarized with a first threshold value, and FIG. 3C is the synthesized background image data. As illustrated in FIGS. 1 and 3A to 3C, in the step of acquiring the synthesized background image data, the first background image data and the second background image data are synthesized on the basis of the brightness information of the sample image data (S140). For the synthesized background image data, the first background image data is used in an area where the single bright spot exists, and the second background image data is used in an area where the dense bright spot exists. A method of acquiring the synthesized background image data is not limited. The synthesized background image data may be set in advance in an area where the single bright spot exists and an area where the dense bright spot exists, the first background image data may be used near a peak position of the single bright spot, the second background image data may be used near a peak position of the dense bright spot, or the synthesized background image data may be acquired by the following method.

Specifically, first, an intensity difference that is a difference between the second intensity distribution of light in the second background image data and the first intensity distribution of light in the first background image data is obtained for each distance. The first background image data is used in an area where the intensity difference of light is less than the first threshold value, and the second background image data is selected in an area where the intensity difference of light is equal to or greater than the first threshold value. Next, the first background image data in the area where the intensity difference is less than the first threshold value and the second background image data in the area where the intensity difference is equal to or greater than the first threshold value are synthesized to acquire synthesized background image data.

Here, the first threshold value is a value including a bright spot existing alone in the area where the intensity difference is less than the first threshold value and including a group of bright spots existing densely in the area where the intensity difference is equal to or greater than the first threshold value. How to obtain the first threshold value will be described later.

Figure 4A:
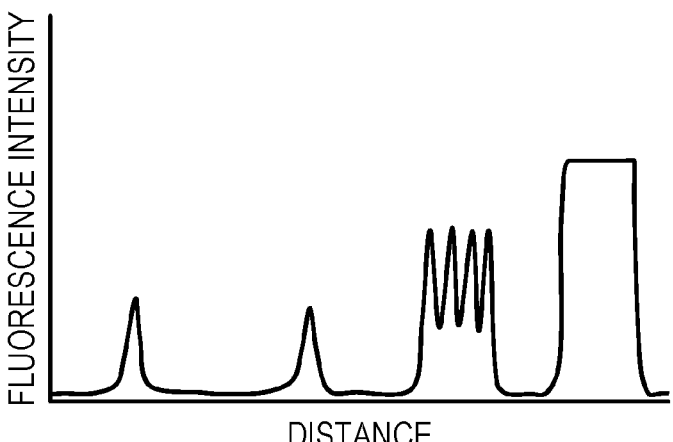
FIGS. 4A and 4B are graphs illustrating an intensity distribution of difference image data.

FIG. 4A is a schematic diagram illustrating difference image data. As illustrated in FIGS. 1 and 4A, in the step of obtaining the difference image data, the intensity difference between the sample image data and the synthesized background image data is obtained (S150). Specifically, a difference between an intensity distribution of the sample image and an intensity distribution of a synthesized image is obtained. The obtained difference image data is mainly an intensity distribution of a signal light from the labeling substance.

Figure 4B:
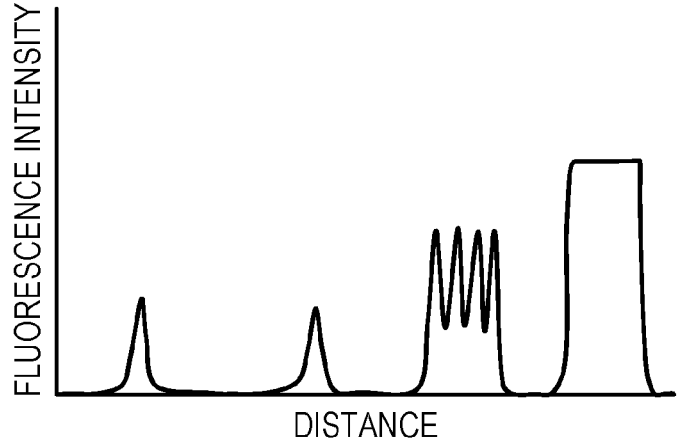

FIG. 4B is a schematic diagram after the difference image data is subjected to noise tolerance processing. As illustrated in FIGS. 1 and 4B, the detection method according to the present embodiment may further perform noise tolerance processing of excluding an intensity distribution less than a second threshold value in the step of obtaining the difference image data (S160). The second threshold value is a threshold value that does not substantially affect the intensity distribution of the signal light from the labeling substance but can remove noise. How to obtain the second threshold value will be described later.

The detection method according to the present embodiment may further include a step of quantifying the target substance on the basis of the difference image data. For example, a calibration curve indicating a relationship between a signal amount and the target substance is obtained in advance, and then, an amount of the target substance can be quantified on the calibration curve. In this case, the target substance may be quantified after expansion processing is performed. When an original extracted bright spot area is only a bright spot peak portion and narrow, by performing the expansion processing, a signal intensity can be measured more accurately since more skirt portions of the bright spot are included. For example, the expansion processing may be executed with 3 pixels×3 pixels.

Figure 5:
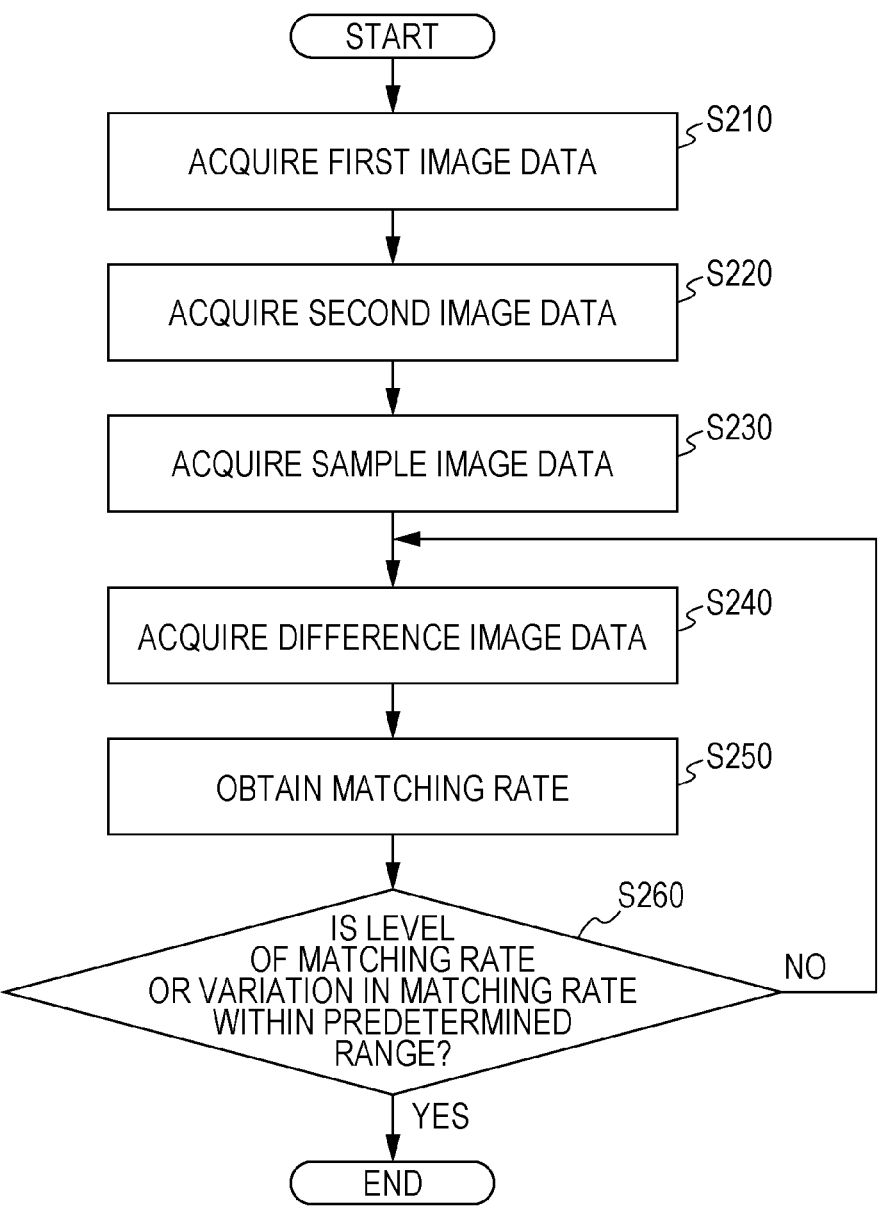
FIG. 5 is a flowchart of how to obtain a first threshold value and a second threshold value.
Figure 6:
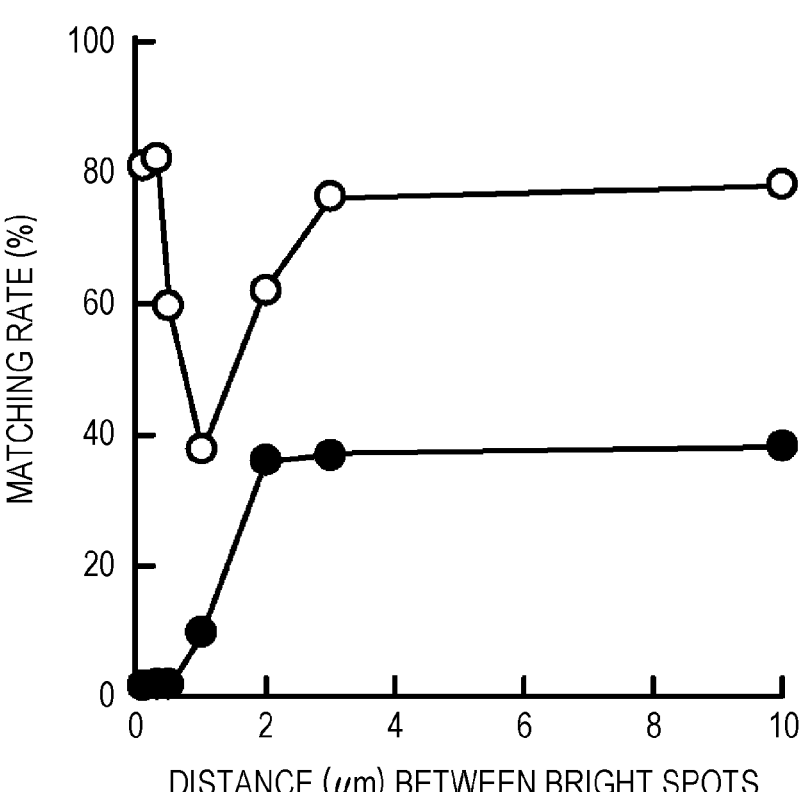
FIG. 6 is a schematic graph illustrating a relationship between a distance between bright spots and a matching rate.

How to obtain the first threshold value and the second threshold value is not limited. The first threshold value and the second threshold value may be preset values or may be obtained by the following method. FIG. 5 is a flowchart for describing how to obtain the first threshold value and the second threshold value, and FIG. 6 is a schematic graph illustrating a relationship between a distance between bright spots and a matching rate. In FIG. 6, the horizontal axis represents the distance (μm) between bright spots, and the vertical axis represents the matching rate (%). As illustrated in FIGS. 5 and 6, a plurality of sample image data obtained by synthesizing a plurality of first images (corresponding to an image of only fluorescence derived from a bright spot without autofluorescence) including only a labeling substance arranged at different densities and a second image (corresponding to an image of only autofluorescence) obtained without labeling a target substance with the labeling substance is prepared, an image feature amount of a bright spot is reduced by using a first filter and a second filter for each of the plurality of sample image data, a plurality of reduced image data in which the bright spot is extracted is acquired by using the first threshold value and the second threshold value, difference image data that is a difference between first image data and each of the plurality of reduced image data is acquired, and the first image data and a plurality of the difference image data are compared to each other, and the first threshold value and the second threshold value are selected on the basis of a matching rate of the bright spot in the first image data and the bright spot in the plurality of difference image data.

First, a plurality of first images including only labeling substances having different densities are prepared (S210). Specifically, the first images in which the labeling sub- stances are arranged at predetermined intervals are prepared. For example, the first images in which the labeling sub- stances including phosphor integrated particles are arranged at intervals of 0.1 μm, 0.3 μm, 0.5 μm, 1.0 μm, 2.0 μm, 3.0 μm, and 10 μm are prepared. In addition, a second image of a sample in which a target substance is not labeled with a labeling substance is prepared (S220). Specifically, the same data as the sample image data is prepared except that the target substance is not labeled with the labeling substance. Next, a plurality of first image data and second image data are synthesized to prepare a plurality of sample image data (S230).

Then, the difference image data is obtained in a similar manner to the detection method according to the present embodiment (S240). At this time, the first threshold value and the second threshold value are arbitrary values. Next, the first image and the difference image data are compared to obtain a matching rate of a bright spot in the first image and a bright spot in the difference image data (S250). The matching rate is obtained for each of the acquired difference image data. Note that the matching rate is obtained for each of a bright spot existing alone and bright spots existing densely. On the basis of the above result, the first threshold value and the second threshold value are changed to obtain a threshold with a high matching rate or a first threshold value and a second threshold value with the smallest varia- tion in matching rate (S260). At this time, when a level of the matching rate or the variation in the matching rate is within a predetermined range, the first threshold value and the second threshold value are set as threshold values used in the detection method (S260; Yes). Note that the first threshold value and the second threshold value with a high matching rate and the smallest variation in matching rate may be obtained. For example, a threshold value with which an average value of the matching rate for each distance between bright spots is 50% or more and the variation in matching rate is minimized may be selected. On the other hand, when the height of the matching rate or the variation in the matching rate is out of a predetermined range, the first threshold value or the second threshold value is changed, and the difference image data is obtained again (S260; No). For example, in the example illustrated in FIG. 6, a condi- tion of the threshold values indicated by white circle sym- bols is preferable. The first threshold value and the second threshold value are used as threshold values used in the detection method.

Effects

As described above, in the detection method according to an embodiment of the present invention, it is possible to detect both a bright spot existing alone and a group of bright spots existing densely, and thus, it is possible to increase detection accuracy.

In the present embodiment, the second background image data is acquired after the first background image data is acquired. However, the first background image data may be acquired after the second background image data is acquired, or the first background image data and the second background image data may be acquired simultaneously.

Although a median filter is used as the first filter and the second filter in the present embodiment, a frequency filter may be used as the first filter or the second filter. In this case, in the detection method according to an embodiment of the present invention, it is also possible to appropriately detect either a bright spot existing alone or a group of bright spots existing densely.

The detection method according to an embodiment of the present invention is useful, for example, for pathological diagnosis of cancer or the like.

An embodiment of the present invention allows a target substance to be appropriately detected in either a bright spot existing alone or a group of bright spots existing densely.

Although embodiments of the present invention have been described and illustrated in detail, the disclosed embodiments are made for purposes of illustration and example only and not limitation. The scope of the present invention should be interpreted by terms of the appended claims.

What is claimed is:

1. A detection method comprising:

preparing sample image data of a sample in which a target substance is labeled with a labeling substance;

acquiring first background image data in which an image feature amount of a single bright spot in the sample image data is reduced by a first filter;

acquiring second background image data in which an image feature amount of a dense bright spot in the sample image data is reduced by a second filter;

synthesizing the first background image data and the second background image data on a basis of brightness information of the sample image data and acquiring synthesized background image data;

obtaining difference image data that is a difference between the sample image data and the synthesized background image data; and the image feature amount is an intensity distribution of light, in the acquiring of the synthesized background image data, an intensity difference that is a difference between a second intensity distribution of light in the second background image data and a first intensity distribution of light in the first background image data is obtained, and a synthesized intensity distribution is acquired by using the first background image data in an area where the intensity difference is less than a first threshold value and using the second background image data in an area where the intensity difference is greater than or equal to the first threshold value.

2. The detection method according to claim 1, further comprising quantifying the target substance on a basis of the difference image data.

3. The detection method according to claim 1, wherein the image feature amount is an intensity distribution of light, and an intensity distribution of light in the sample image data reduced by the first filter and an intensity distribution of light in the sample image data reduced by the second filter are different in a peak width in the intensity distribution, a peak height in the intensity distribution, or the peak width and the peak height.

4. The detection method according to claim 1, wherein at least one of the first filter or the second filter is a median filter.

5. The detection method according to claim 1, wherein at least one of the first filter or the second filter is a frequency filter.

6. The detection method according to claim 1, wherein in the obtaining of the difference image data, noise tolerance processing of excluding the intensity distribution less than a second threshold value is further performed.

7. The detection method according to claim 2, wherein in the quantifying of the target substance, expansion processing is further performed.

8. The detection method according to claim 6, wherein a plurality of sample image data obtained by synthesizing
  a plurality of first image data of a sample including only a labeling substance arranged at different densities and second image data of a sample acquired without labeling a target substance with the labeling substance is prepared,
an image feature amount of a bright spot is reduced by using the first filter and the second filter for each of the plurality of sample image data, and a plurality of reduced image data from which the bright spot is extracted is acquired by using the first threshold value and the second threshold value,
the difference image data that is a difference between each of the plurality of first image data and each of the plurality of reduced image data is acquired,
the plurality of first image data and a plurality of the difference image data are compared to each other, and
the first threshold value and the second threshold value are selected on a basis of a matching rate between the bright spot in the plurality of first image data and the bright spot in the plurality of the difference image data.

* * * * *